US005626900A

United States Patent [19]

Miller

[11] Patent Number: 5,626,900
[45] Date of Patent: May 6, 1997

[54] METHOD OF PREPARATION OF CHOCOLATE CRUMB, AND PRECURSOR COMPONENT THEREFOR

[76] Inventor: Van Miller, R.R. #2, Brisbane, Erin, Ontario, Canada, N0B 1T0

[21] Appl. No.: 602,417

[22] Filed: Feb. 16, 1996

[51] Int. Cl.$^6$ .............................. A23G 3/00; A23C 9/18
[52] U.S. Cl. ..................... 426/580; 426/588; 426/659; 426/660; 426/631
[58] Field of Search .......................... 426/660, 580, 426/588, 631, 659, 572

[56] References Cited

U.S. PATENT DOCUMENTS

| | | | |
|---|---|---|---|
| 3,622,342 | 11/1971 | Rusoff | 426/660 |
| 4,084,011 | 4/1978 | Chevalley et al. | 426/580 |
| 4,086,371 | 4/1978 | Minifie et al. | 426/658 |
| 5,393,538 | 2/1995 | Chmiel et al. | 426/35 |

OTHER PUBLICATIONS

"Chocolate, Cocoa and Confectionery . . . " B.W. Minifie, AVI Publishing Company, Inc., 1980, 2nd Edition, pp. 108–114.

"Spray dried whole milk powder . . . " S.O. Hansen & P.S. Hansen, Dairy Information, Feb. 1990, pp. 79–82.

"The Influence of Milk Fat . . . " G. Hogenbirk, Proceeding of 44th PMCA Production Conference, 1990, pp. 53–60.

"Incorporation of Milkfat Fractions . . . " C.M. Barna, R.W. Hartel & S. Metin, Proceedings of PMCA Production Conference, 1992, pp. 62–71.

*Primary Examiner*—Jeanette Hunter
*Attorney, Agent, or Firm*—Donald E. Hewson

[57] ABSTRACT

Milk chocolate may be prepared from a chocolate crumb, or other milk and sugar precursor component, by which the required amount of dried milk solids are provided for subsequent processing, together with at least some sugar. Molasses or brown sugar is hydrated with milk, dried, and further processed by addition of the balance of sugar, fats, cocoa butter, and cocoa liquor if used; and the product is then set aside for subsequent pasting and conching operations which are typically used in the production of milk chocolate.

20 Claims, No Drawings

METHOD OF PREPARATION OF CHOCOLATE CRUMB, AND PRECURSOR COMPONENT THEREFOR

FIELD OF THE INVENTION

This invention relates to the milk chocolate industry, and is particularly directed to methods for preparation of a milk and sugar precursor component for chocolate crumb, or for the production of chocolate crumb, from which the milk chocolate to be produced will subsequently be made. Specifically, the present invention provides processes whereby molasses, either in the form of liquid molasses or in intimate combination with fine sugar crystals as brown sugar, may be utilized to provide the required caramel-like flavor ingredient for the milk chocolate. Still further, the processes of the present invention will allow for significant savings in the cost of capital equipment and the cost of production; and they will further permit close control as to flavor, color, and fat availability, as compared with previously known methods for production of chocolate crumb.

BACKGROUND OF THE INVENTION

Chocolate is one of the world's favorite food products, and may be found in a variety of forms including dark chocolate, white chocolate, and milk chocolate—including white milk chocolate. Chocolate is, of course, a food substance, of which the principal constituents are chocolate liquor and cocoa butter, both of which are derived from cocoa beans, together with sugar. When milk chocolate is prepared, the formulation will include milk solids, including butter fat, as well. Milk chocolate is substantially anhydrous.

While many countries have their own standards for milk chocolate, it is essentially universally held that there must be no less than 12% of milk solids—and usually in the range of 20% to 35%, including butter fat—included in the milk chocolate formulation. The fat system which is found in milk chocolate is the combination or blend of cocoa butter together with butter fat. It follows that milk chocolate is a suspension, in which the milk solids and sugar are suspended in a fat system.

Indeed, a general consideration during the production of milk chocolate is that the available butter fat which comes from the milk constituent, and which is added to the chocolate formulation, must be miscible with the cocoa butter and will blend with the cocoa butter so as to form the fat system of the milk chocolate. It is well noted that cocoa butter and butter fat have quite dissimilar characteristics, although they may be tempered in a similar fashion at specific tempering temperatures and dwell times, in order to achieve the required chocolate characteristics of hardness and snap. Cocoa butter and butter fat do not form a eutectic within which various fat crystal structures can be detected with the desired characteristics being available only within very narrow ranges; and thus, the compatibility as to crystalline structure and as to hardness between the butter fat and cocoa butter are important to the chocolate maker. Certain aspects thereof, however, are outside the scope of the present invention.

The production of milk chocolate generally will follow one of several different processes. One approach is to mix a chocolate nib, together with sugar, milk powder, and cocoa butter and, after being mixed together, the mix is refined, pasted, and conched. Another approach is to mix together chocolate liquor, pulverized sugar, milk powder, and cocoa butter, followed by refining, pasting, and conching. Indeed, the milk powder which may be used in those processes may conveniently be the milk powder which is described in Applicant's copending U.S. patent application Ser. No. 08/543,571, filed Oct. 16, 1995.

A third, very common process for the production of milk chocolate, is to mix together chocolate crumb together with cocoa butter in a mixer or paster, refining the mix, and then repasting the mix, and finally conching. The advantage of that process is that the chocolate crumb, which is in a powder form, may have been manufactured previously, up to many months previously; or, indeed, the chocolate crumb may have been manufactured in an entirely different factory or even in a different country. Another particular advantage of the use of chocolate crumb is that it has extremely good storage and keeping properties, provided that it is stored in such a manner that it will not readily pick up moisture, and it provides a product which will generally meet very strict bacteriological specifications, especially when compared with other milk products. Yet a further advantage of manufacturing chocolate crumb is that very considerable quantities may be manufactured during periods when milk productivity is high, such as during the summer, and may then be utilized for milk chocolate manufacture during the winter when the production quantities of milk may have been reduced.

Previously, milk chocolate crumb has particularly been developed, and the processes approved and adopted by manufacturers in the United Kingdom. However, it must be noted that a particular feature of milk chocolate requires that there shall be a caramel-like flavor ingredient carried into the milk chocolate formulation by the sugar constituent thereof. This has meant, heretofore, that the sugar constituent of the chocolate, or at least a portion of the sugar constituent of the chocolate, shall be at least partially caramelized; and the flavor and color of the caramelization of the sugar constituent of the chocolate will carry into the milk chocolate product when it is produced. Since milk chocolate is quite sweet, the predominant constituent thereof is sugar. Thus, flavor contributions to the milk chocolate have, heretofore, come particularly from the caramelized sugar as well as from the chocolate liquor—which will comprise cocoa butter and cocoa liquor; but if white chocolate is to be made, then cocoa liquor will not be employed. The sweetness of the milk chocolate is derived, as noted, from the sugar constituent thereof.

Traditionally, factories for the production of chocolate crumb have generally been situated in dairy regions. The general processes followed for the production of chocolate crumb, up to the present time, are as follows:

Milk is brought into the factory, filtered, cooled, and stored. Usually, the milk is then evaporated or condensed, so that the still liquid milk product contains about 30% up to 40% of total solids; it being understood that whole milk will contain about 12% milk solids, including butter fat. Sugar is added to the condensed milk, in keeping with the particular recipe of the chocolate manufacturer, and that mix is then condensed to become about 90% solids. At that time, some of the sugar constituent in the mix will begin to crystallize.

The milk and sugar concentrate is then added to cocoa liquor and kneaded, during which crystallization of the sugar will continue.

Then, the concentrate is dried at temperatures generally ranging from 75° C. up to 110° C. for from 4 to 8 hours. Close control is required because during the drying process caramelization of the sugar will be brought about. It follows, therefore, that the flavor of the milk chocolate which will ultimately be produced will be quite dependent upon the time and temperature at which the concentrate has been dried, and from which the degree of caramelization of the sugar is controlled.

The then prepared crumb is removed from the oven or dryer where it has been prepared. The crumb is essentially anhydrous, having less than 1% moisture.

Alternatively, instead of the concentrate having been kneaded, it may be passed to a heat exchanger evaporator. There, the solids of the concentrate are increased to about 95% or 96%, and caramelization of the sugar occurs at the same time. This process is much faster, because the cooking time is limited to about 2 to 5 minutes, de:pending on the extent of the caramelization of the sugar which is required.

A typical milk crumb composition may be essentially as follows:

cocoa liquor, about 5% by weight of the crumb composition, up to about 13.5% by weight of the crumb composition;

the fat constituent carried into the crumb composition by the cocoa liquor may be from about 2.8% by weight of the crumb composition up to about 7.3% by weight thereof;

about 53% of the crumb composition will be sugar;

milk solids of the crumb composition will be about 32%, of which about 9.2% by weight of the crumb composition is fat;

there may be limited amounts of moisture, generally below 1%;

there may also be an additional amount of cocoa butter added to the crumb composition, in keeping with the present invention as described hereafter, in an amount up to about 10%;

the fat content of the chocolate crumb will generally be in the range of 16.5% to about 22%;

the milk solids in the chocolate crumb, not including butter fat, will generally be about 23%; and the total amount of dried milk solids and butter fat found in milk chocolate crumb will generally be in the range of about 30% to 34% by weight.

As noted previously, the production of milk chocolate may follow many months later than the production of the chocolate crumb, and in a different location. The chocolate crumb is mixed together with cocoa butter to form a paste, it is refined and then re-pasted, and finally it is conched so that the mixture obtains a fine chocolate with very low particle size.

Further discussion of the product and manufacture of chocolate, with particular emphasis on milk chocolate, as the industry had developed up to about 1980, is found in *Chocolate, Cocoa and Confectionary Science and Technology*, second edition, by Bernard W. Minifie, copyright 1980, published by AVI Publication Company, Inc., of Westport, Connecticut, U.S.A., at pages 105 through 114.

A further prior teaching of machinery for the production of chocolate crumb is MINIFIE et al U.S. Pat. No. 4,086,371, issued April 25, 1978. That patent teaches a continuous process for production of a crumb product, particularly chocolate crumb, where a feed stock of sugar, milk solids, a significant amount of moisture, and chocolate when required, is heated to about 125° C. and condensed to have a moisture content of about 4% to 6%. A vertical column is employed, and the condensed material is maintained at its final temperature until it is transferred to a crystallizer. There, the product is moved downwardly and kneaded and, at the same time, it is cooled. This results in a crystallized particulate product, where the sugar has been caramelized to an extent governed by the temperature and dwell time.

Still further, the present inventor has provided a further batch process for the preparation of chocolate crumb, by which the same flavor profile is achieved, and with the same caramelization flavor contribution for the chocolate crumb as has been previously found in prior methods as noted above, as described in copending U.S. patent application Ser. No. 08/543,571, filed Dec. 29, 1995.

In that copending application, chocolate crumb is provided so as to have substantially the same analysis and fat profile as prior chocolate crumbs; but with higher availability of fat to enter into the fat system of the chocolate crumb. This is achieved, in keeping with the copending application, by taking only a portion of the sugar content which will be found in the chocolate crumb and hydrating it with a small portion of milk, of which the water content is just sufficient to hydrate the sugar. That hydrated sugar is then cooked or heated sufficiently to a point where a desired degree of caramelization is achieved; and there will then be sufficient caramelization to flavor an entire batch having 100% sugar contribution, but of which only a small portion of the sugar has been caramelized. The desired flavor profile for the entire batch, having the same flavor profile as prior milk chocolate crumbs, will be achieved. Moreover, the color for the entire batch will also be equivalent to prior milk chocolate crumbs.

Quite unexpectedly, however, the present inventor has determined that a desired flavor profile may be obtained without even the necessity for caramelization of sugar, and the requisite cooking or heating of the same. Rather, the desired flavor profile may be achieved by resorting instead to the use of molasses, which is derived from cane sugar, and which has the same basic chemical or molecular structure as refined white sugar but with a more or less noticeable to strong caramel-like or butterscotch flavor.

Indeed, a small presence of molasses in a very finely divided sugar batch will provide to that sugar batch a flavor which is indistinguishable from the flavor contribution achieved either by slightly caramelizing the batch of sugar or adding to it caramelized sugar. In all events, a caramel-like or, to some persons, a butterscotch flavor, will be achieved.

However, the contribution of molasses to the flavor profile may be derived either from the use of molasses per se, or by the use of brown sugar; it being noted that brown sugar is an intimate mixture of fine sugar crystals together with molasses, generally with the molasses coating the fine sugar crystals.

At this point, it is appropriate to consider the production of sugar and molasses, at least to the extent necessary for a more complete understanding of the present invention. In the first instance, while sugar may be derived from sugarcane or sugar beet, molasses—or, at least, any molasses which has a palatable taste—is derived only from sugarcane.

Traditionally, after sugarcane is harvested, and the cane stocks are stripped of leaves, they are transported to a sugar mill where cane juice is extracted from the sugarcane by crushing, shredding, and passing the crushed and shredded cane through a series of heavy rollers. After the juice is boiled and clarified, the resulting thick syrup is placed into a centrifuge and processed until sugar crystals known as raw cane sugar, and dark thick molasses, are obtained. Very often, the raw sugar is then shipped to a sugar refinery, where it is washed to remove the molasses and then dissolved into a water syrup. After filtering or other processing to remove impurities and/or any remaining coloring agents, the sugar is crystallized by being boiled in vacuum pans, washed, and centrifuged, until granulated white sugar results.

At this stage, brown sugar may be extracted from the syrup which remains after the granulated white sugar has been removed; and the brown sugar comprises fine crystals of white sugar covered with a film of colored and highly refined molasses-flavored syrup. Alternatively, it is quite common to continue the refining process until all white sugar has been obtained; and then to intimately mix the white sugar with molasses syrup, or even molasses, in varying quantities to obtain an essentially identical product comprising fine crystals of white sugar that are covered with a film of molasses-flavored syrup. The brown sugar may be graded as yellow sugar, light brown sugar, or dark brown sugar; with the flavor of the molasses constituent being more distinguishable in the darker brown sugars than in yellow or light brown sugars.

However, as noted above, the flavor profile of a sugar batch to which brown sugar or molasses has been added and the batch thoroughly mixed, will be such that a caramel-like flavor is discernible. Because flavor is not specifically a characteristic that can be measured using even the most highly sophisticated laboratory instruments, although sweetness can be readily determined, the precise flavor profile and contribution thereto by the molasses, or caramelization of sugar, become matters of personal choice as determined by the chocolate maker. The chocolate maker, obviously, is driven by his own market, and whatever flavor profiles of chocolate appeal to his customers. Nonetheless, the chocolate maker is thereby capable of making a determination of the selected amount of caramel-like flavor to be present in the milk chocolate which he intends to produce and also, therefore, to be present in a milk and sugar precursor component, or the chocolate crumb, from which the milk chocolate will ultimately be processed.

Even if white milk chocolate is to be produced, the methods and processes of the present invention may be employed. It is, of course, recognized that white milk chocolate does not actually have a white color, but may have a light beige or, more usually, an ivory color, as compared with the usual medium or slightly dark brown color of ordinary milk chocolate.

Accordingly, it is an object of the present invention to provide processes for the preparation of a milk and sugar precursor component to be used :for the subsequent production of milk chocolate, or in a further extension of the processes to provide chocolate crumb. The flavor profile, or at least the contribution of a caramel-like flavor within the flavor profile, will be equivalent to prior processes; but the processes may be carried out using simpler equipment but with excellent control.

In keeping with the present invention, at least in the preparation of the milk and sugar precursor component thereof, any of skim milk, whole milk, or condensed milk, may be employed.

In keeping with further provisions of the present invention, particularly in respect of the preparation of chocolate crumb, the total amount of dried milk solids may be closely controlled, at least in part by the optional incorporation of anhydrous butter fat, so that the total amount of dried milk solids and anhydrous butter fat in the chocolate crumb may be within a selected and defined range.

Still further, the present invention provides that total fat availability may be provided, notwithstanding that in ordinary processes of chocolate crumb preparation some butter fat may be encapsulated in the serum products of whole milk as it is dried and, therefore, be unrecoverable as fat to enter the fat system of the chocolate crumb.

Finally, as noted above, a particular object or purpose of the present invention is to provide for contribution to the flavor profile in a selected manner, as determined by the chocolate manufacturer, whereby the desired caramel-like flavor is derived from molasses. The molasses may, itself, be brought into the formulation as molasses or as coating on fine sugar crystals as is found in brown sugar.

SUMMARY OF THE INVENTION

In accordance with one aspect of the present invention, there is provided a method for the preparation of a milk and sugar precursor component which will used later for the subsequent production of milk chocolate. The milk chocolate to be produced will at least comprise dried milk solids, sugar, anhydrous cocoa butter, and a caramel-like flavor ingredient; and the milk and sugar precursor component of the present invention will provide the entire dried milk solids content and the caramel-like flavor ingredient for the milk chocolate to be produced.

At least a first sugar portion of the milk and sugar precursor component is molasses.

The following steps are followed in the preparation of the milk and sugar precursor of the present invention:

(a) A determination of the total amount, in weight units, of dried milk solids to be present in the milk and sugar precursor component is made. As noted above, the entire dried milk solids content of the milk chocolate to be produced is provided by the milk and sugar precursor component being prepared.

(b) A determination is made for a selected amount of caramel-like flavor ingredient to be present in the milk and sugar precursor component. As discussed above, the caramel-like flavor ingredient is ultimately carried into the milk chocolate to be produced, and provides the caramel-like flavor portion of the flavor profile thereof.

(c) A selected quantity of molasses is mixed with at least a first portion of liquid milk. The quantity of molasses that is chosen is selected so as to provide the selected amount of caramel-like flavor ingredient. Moreover, the at least first portion of liquid milk comprises a first portion of :milk solids and a first portion of water, and the first portion of water is sufficient to hydrate the selected quantity of molasses. A slurry batch of hydrated molasses and liquid milk is thereby formed.

(d) In the event that the weight of the first portion of milk solids in the first portion of liquid milk chosen in step (c), above, is less than the total selected amount of milk solids ultimately intended to be present in the milk and sugar precursor component, then the slurry batch is mixed with a second portion of liquid milk so that the total weight of milk solids in the first portion of liquid milk and the second portion of liquid milk, if used, becomes the total selected amount of milk solids.

(e) The slurry batch from step (c) or from step (d), if used, is then dried. There is thus obtained the total weight of total milk solids as dried milk solids, together with the selected quantity of molasses as precipitate after dehydration of the slurry batch, in a dried milk and sugar precursor component.

(f) Finally, the dried milk and sugar precursor component may be set aside for later use in the preparation of milk chocolate to be produced.

The molasses which is selected in step (c), above, may be selected as a constituent of brown sugar, which comprises an intimate mixture of fine sugar crystals and molasses. If so, an amount of brown sugar is selected so as to provide the selected quantity of molasses, together with a first portion of fine sugar crystals. In that instance, the first portion of water and the first portion of liquid milk utilized in step (c), above, must be sufficient to hydrate the selected quantity of molasses together with the first portion of fine sugar crystals.

The above method may comprise, after step (e), the following step:

(g) The dried milk and sugar precursor component of step (e) is mixed together with a second portion of sugar to form a sweet dried milk and sugar precursor component. In this case, the total amount of sugar in the sweet dried milk and sugar precursor component is equal to the selected amount of sugar to be present in the milk chocolate which is ultimately to be produced.

The above method of preparation of a sweet dried milk and sugar precursor component can be further extended to the preparation of anhydrous chocolate crumb, where the final analysis of the anhydrous chocolate crumb, expressed in weight units, will be as follows:

| | |
|---|---|
| dried milk solids | 23 to 34 |
| sugar and molasses as caramel-like flavor ingredient | 50 to 55 |
| anhydrous cocoa butter and anhydrous cocoa liquor (if used) | 8 to 16 |
| additional anhydrous butter fat | 0 to 10 |
| moisture | less than 1 |

Here, the total amount of dried milk solids and anhydrous butter fat, if used, will be in the range of 30 to 34 weight units. Also, if the anhydrous chocolate crumb is to be anhydrous white chocolate crumb, anhydrous cocoa liquor will not be used. The method comprises the following further steps:

(h) First, it is ensured that the total amount of sugar in the sweet dried milk and sugar precursor component of step (g), above, including the selected quantity of molasses, is in the range of 50 to 55 weight units. If not, step (g) is repeated.

(i) Then, additional anhydrous butter fat is added to the sweet dried milk and sugar precursor component, if necessary, so as to bring the total amount of dried milk solids and anhydrous butter fat into the range of 30 to 34 weight units.

(j) Finally, the sweet dried milk and sugar precursor component is mixed, either just prior to step (i) or just following step (i), with anhydrous cocoa butter and anhydrous cocoa liquor, if used, so as to arrive at a total presence of 8 to 16 weight units of anhydrous cocoa butter together with anhydrous cocoa liquor, if used.

In yet another aspect of the present invention, chocolate crumb is prepared. If the chocolate crumb is intended for use in the manufacture of ordinary milk chocolate, it will have the following analysis, expressed in weight units:

| | |
|---|---|
| dried milk solids | 23 to 34 |
| sugar | 50 to 55 |
| anhydrous cocoa butter | 8 to 12 |
| anhydrous cocoa liquor | 4 to 8 |
| additional anhydrous butter fat | 0 to 10 |
| moisture | less than 1 |

Otherwise, if the chocolate crumb is intended for use in the preparation of white milk chocolate, it will have the following analysis, expressed in weight units:

| | |
|---|---|
| dried milk solids | 23 to 34 |
| sugar | 50 to 55 |
| anhydrous cocoa butter | 8 to 16 |
| additional anhydrous butter fat | 0 to 10 |
| moisture | less than 1 |

In either event, the total amount of dried milk solids and anhydrous butter fat will be in the range of 30 to 34 weight units; and at least a first portion of the sugar constituent of the chocolate crumb will be brown sugar, which comprises an intimate mixture of fine sugar crystals and molasses. The following steps are followed:

(a) A first portion of liquid milk is mixed with at least a first portion of brown sugar. The first portion of liquid milk comprises a first portion of milk solids and a first portion of water, and included in the milk solids there may be butter fat; the first portion of water is sufficient to hydrate the sugar. There is thus formed a slurry batch of hydrated brown sugar and liquid milk.

(b) The slurry batch is mixed with a second portion of liquid milk, in the event that the weight of milk solids of the first portion of liquid milk is less than within the range of 23 to 34 weight units. Thus, the total weight of milk solids comprising the milk solids of the first portion of liquid milk and the milk solids of the second portion of liquid milk, if used, is in any event within the range of 23 to 34 weight units. A pre-crumb slurry is thereby formed.

(c) The pre-crumb slurry is transferred to a conventional drier, and dried so as to obtain the total weight of milk solids as dried milk solids, together with the brown sugar.

(d) The total weight of dried milk solids and brown sugar is then mixed together with a second portion of sugar, in the event that the weight of sugar of the first portion of sugar is less than within the range of 50 to 55 weight units. Thus, the total weight of sugar of the first portion of sugar and the second portion of sugar, if used, will then and in any event be within the range of 50 to 55 weight units. There is thus formed a sweet pre-crumb slurry.

(e) The sweet pre-crumb slurry is then mixed together with anhydrous cocoa butter, or with anhydrous cocoa butter and anhydrous cocoa liquor, so as to arrive at the selected analysis amounts of anhydrous cocoa butter and anhydrous cocoa liquor, if used.

(f) Additional anhydrous butter fat may then be added, if necessary, so as to bring the total amount of dried milk solids and anhydrous butter fat into the range of 30 to 34 weight units of the prepared chocolate crumb.

(g) Finally, the prepared chocolate crumb may then be refined, if necessary, for pasting and for the further step of conching, or it may then be conched if necessary, for recovery and further processing or storage.

If liquid milk is used in step (a), and also in step (b) if step (b) is used, then it may chosen from the group consisting of skim milk which has up to 92% by weight of water, and up to 9.6% by weight of milk solids, and no butter fat. The liquid milk may, alternatively, be whole milk which has up to 89% by weight of water, up to 9.6% by weight of milk solids, and up to 5% by weight of butter fat. Finally, the liquid milk may be condensed milk which has 50% to 70% by weight of water, up to 14.7% by weight of milk solids, and up to 7.7% by weight of butter fat.

DETAILED DESCRIPTION OF THE PREFERRED EMBODIMENTS

As noted above, the present invention provides methods for the preparation of a milk and sugar precursor component for chocolate crumb, or for the production of chocolate crumb; also, the present invention is applicable either to conventional milk chocolate or white milk chocolate. As noted, white milk chocolate differs from conventional milk chocolate in that it does not contain anhydrous cocoa liquor, but it usually contains a higher percentage by weight of anhydrous cocoa butter. In any event, also as noted, any milk chocolate is essentially an anhydrous edible product.

In particular, it has been noted that the required caramel-like flavor ingredient for the milk chocolate precursor component or the chocolate crumb of the present invention comes from the use of molasses. The molasses may be introduced into the formulation as molasses, or it may be introduced into the formulation as the intimately combined coating found on fine sugar crystals in brown sugar. The molasses is derived from cane sugar, and enters into and becomes part of the sugar constituent of the milk and sugar precursor component or chocolate crumb, as provided for by this invention.

Typically, all formulations for milk chocolate crumb are set forth in such a manner that the presence of each of the constituents of that formulation is stated in weight units. Anhydrous milk chocolate crumb, which will come as a product of the present invention either by further processing of additional ingredients to the milk and sugar precursor component, or as a consequence of other features of the present invention, will have a final analysis for the ingredients, expressed in weight units, as follows:

TABLE I

| | |
|---|---|
| dried milk solids | 23 to 34 |
| sugar and molasses as caramel-like flavor ingredient | 50 to 55 |
| anhydrous cocoa butter and anhydrous cocoa liquor (if used) | 8 to 16 |
| additional anhydrous butter fat | 0 to 10 |
| moisture | less than 1 |

When both anhydrous cocoa butter and anhydrous cocoa liquor are used for purposes of preparation of conventional chocolate crumb, their presence in the above formulation may be in the following amounts:

TABLE II

| | |
|---|---|
| anhydrous cocoa butter | 8 to 12 |
| anhydrous cocoa liquor | 4 to 8 |

It follows, therefore, that prepared chocolate crumb which will ultimately be processed into conventional milk chocolate will have the following analysis:

TABLE III

| | |
|---|---|
| dried milk solids | 23 to 34 |
| sugar | 50 to 55 |
| anhydrous cocoa butter | 8 to 12 |
| anhydrous cocoa liquor | 4 to 8 |
| additional anhydrous butter fat | 0 to 10 |
| moisture | less than 1 |

On the other hand, where the chocolate crumb is intended for ultimate processing into white chocolate, it will typically have the following analysis:

TABLE IV

| | |
|---|---|
| dried milk solids | 23 to 34 |
| sugar | 50 to 55 |
| anhydrous cocoa butter | 8 to 16 |
| additional anhydrous butter fat | 0 to 10 |
| moisture | less than 1 |

The weight unit which is employed may be pounds or kilograms. Typically, a weight unit is 10 kilograms, so that the size of a batch of prepared chocolate crumb which is manufactured in keeping with the present invention is in the range of 1,000 kilograms.

Of any of the above analyses, the total amount of dried milk solids contributed from milk, in either the milk and sugar precursor component, or in the milk chocolate crumb, together with any additional anhydrous butter fat that is added to the mixture in the event that skim milk has been used, is in the range of 30 to 34 weight units; typically, therefore, 300 to 340 kilograms.

When a milk and sugar precursor component is to be manufactured in keeping with the present invention, and a determination has been made of the total amount, in weight units, of dried milk solids that will be present in the milk and sugar precursor component to be manufactured, then the chocolate maker must make a further determination as to the selected amount—that is, the contribution to the flavor profile—of the caramel-like flavor ingredient to be present in the milk and sugar precursor component. As noted, that caramel-like flavor ingredient will carry through into milk chocolate, crumb or milk chocolate product as the caramel-like flavor ingredient of the flavor profile thereof. The specific contribution of the molasses as a caramel-like flavor to the flavor profile is, as noted, a matter of choice as determined by the chocolate maker.

In any event, there is no necessity for caramelization, and no necessity for heating or cooking the sugar constituent or even a portion of the sugar constituent, in order to obtain the required and desired flavor profile.

If molasses per se is to be utilized in the preparation of the milk and sugar precursor component, then the chocolate maker will mix a selected quantity of the molasses with at least a first portion of liquid milk. That first portion of liquid milk will comprise a first portion of milk solids and a first portion of water; and the first portion of water must be sufficient to hydrate the selected quantity of molasses in order to form a slurry batch of hydrated molasses and liquid milk.

However, in the event that the first portion of milk solids in the first portion of liquid milk is less than the total selected amount of milk solids ultimately to be found as the dried milk solids component of the milk and sugar precursor component, then the slurry batch is mixed with a second portion of liquid milk which has been chosen so that the total weight of milk solids will become the selected amount of milk solids required for the formulation.

In any event, the slurry batch containing the total selected amount of milk solids is then dried, usually in a conventional milk drier. This may require spraying the slurry batch into a drier; however, the precise step of drying the, slurry batch may be considered to be conventional and outside the purpose of the present invention, since milk driers are well known. In this case, it is a sweetened milk, having a hydrated sugar dissolved in the water portion of the milk. In any event, the total weight of milk solids as dried milk solids, together with the selected quantity of molasses as precipitate after dehydration thereof, will now be available in a dried milk and sugar precursor component.

That dried milk and sugar precursor component may then be set aside for later use in the preparation of milk chocolate.

Moreover, the dried milk and sugar precursor component may be mixed, once again, with a second portion of sugar, so as to form a sweet dried milk and sugar precursor component. In that event, the total amount of sugar is equal to the selected amount of sugar which will be present in the milk chocolate when it is ultimately produced.

Still further, the molasses which is utilized may be available to the chocolate maker as a constituent of brown sugar. As noted, brown sugar comprises an intimate mixture of fine sugar crystals and molasses; and the amount of brown sugar that is selected will be such as to provide the selected quantity of molasses required for the selected caramel-like flavor ingredient contribution to the flavor profile. In that event, of course, the first portion of water that is present in the first portion of liquid milk, as discussed above, must be sufficient to hydrate both the selected quantity of molasses tot;ether with the first portion of fine sugar crystals that are present in the selected amount of brown sugar.

It follows, therefore, in that event, that the dried milk and sugar precursor component thus provided at this stage will comprise the total weight of dried milk solids, together with the selected quantity of molasses and a first portion of fine sugar crystals. Also, as noted, the brown sugar may be that which is designated as yellow sugar, or it might be light brown sugar, or dark brown sugar.

Moreover, the liquid milk which is used may be any of skim milk, whole milk, and condensed milk.

Still further, the preparation of milk and sugar precursor component as described above, may be extended to the preparation of anhydrous chocolate crumb, having a final analysis as noted above in Table I. If so, as noted, the total amount of dried milk solids together with anhydrous butter fat, if used, is in the range of 30 to 34 weight units. Also, as noted, anhydrous cocoa liquor will not be used if the anhydrous chocolate crumb is to be anhydrous white chocolate crumb. In any event, the dried milk and sugar precursor component is further processed, after determining that the total amount of sugar, including the selected quantity of molasses, is in the range of 50 to 55 weight units; and then additional anhydrous butter fat will be added, if necessary, to bring the total amount of dried milk solids and anhydrous butter fat into the range of 30 to 34 weight units. The sweet dried milk and sugar precursor component will be mixed with anhydrous cocoa butter, either just before or just after the anhydrous butter fat has been added, if necessary. If, as noted, the chocolate crumb is to be conventional chocolate crumb, then anhydrous cocoa liquor will also be mixed; and, in any event, the total amount of anhydrous cocoa butter and anhydrous cocoa liquor will then be in the range of 8 to 16 weight units thereof.

In keeping with previous discussion, when both anhydrous cocoa butter and anhydrous liquor are used, they will be present in the amounts of 8 to 12 weight units of anhydrous cocoa butter, and 4 to 8 weight units of anhydrous cocoa liquor.

As a refinement of the above, the present invention provides methods for the preparation of chocolate crumb in a more or less continuous batch process. That is, once the preparation of milk chocolate crumb batch has been initiated, it continues. As noted above, a selected amount of molasses per se, or brown sugar may be used. As always, the brown sugar comprises an intimate mixture of fine sugar crystals and molasses.

Typically, the preparation of milk chocolate crumb is initiated by mixing at least a first portion of brown sugar together with a first portion of liquid milk. As before, that first portion of liquid milk will comprise a first portion of milk solids and a first portion of water; and the first portion of water is sufficient to hydrate the brown sugar. There will thus be formed a slurry batch of hydrated brown sugar and liquid milk.

In the event that the weight of milk solids in the first portion of milk thus far utilized is less than the intended amount of dried milk solids to be present in the prepared milk chocolate crumb, a second portion of liquid milk is mixed into the slurry batch. A pre-crumb slurry is thus formed; and it is transferred to a conventional drier and dried so as to obtain the total weight of milk solids as dried milk solids, together with the brown sugar that has so far been utilized.

That dried milk solids and brown sugar is then mixed with a second portion of sugar, in the event that the weight of sugar thus far used is less than the intended total amount of sugar to be present in the milk chocolate crumb being prepared.

The thus formed sweet pre-crumb slurry is then mixed together with anhydrous cocoa butter, and anhydrous cocoa liquor if it is conventional milk chocolate crumb being prepared, so as to arrive at the selected analysis amounts of each of them as they will be present in the prepared chocolate crumb. Additional anhydrous butter fat is then added, if necessary, bringing the total amount of dried milk solids and anhydrous butter fat into the requisite range for the prepared milk chocolate crumb batch. Finally, the prepared chocolate crumb may be refined, if necessary, for pasting and for the further step of conching, or it may then be conched if necessary, for recovery and further processing or storage.

If liquid milk is used, then it may be skim milk, liquid whole milk, or condensed milk. Skim milk generally has up to 92% by weight of water, and up to 9.6% by weight of milk solids, and virtually no butter fat. Whole milk generally has up to 89% by weight of water, up to 9.6% by weight of milk solids, and up to 5% by weight of butter fat. Condensed milk, from which a substantial portion of water has already been removed, usually at the dairy processing plant, generally has 50% to 70% by weight of water, up to 14.7% by weight of milk solids, and up to 7.7% by weight of butter fat.

The fat content of the prepared chocolate crumb, whether it is conventional milk chocolate crumb or white milk chocolate crumb, having formulations as noted in either of Tables III and IV, above, will have a total fat content contributed as follows:

| | |
|---|---|
| from the milk constituent | 0 to 9.6 weight units |
| from the butter fat | 0 to 10 weight units |

If the milk chocolate crumb is conventional milk chocolate crumb, then the fat contribution from cocoa liquor will be 2.2 to 4.4 weight units, and from the cocoa butter will be 8 to 12 weight units; otherwise, if the chocolate crumb is white milk chocolate crumb, the fat contribution from the cocoa butter will be in the range of 8 to 16 weight units.

It is recognized that there are no industry-wide specified standards or requirements with respect to the precise analysis of chocolate crumb or white chocolate crumb, and heretofore there has been no approach taken towards the preparation of milk chocolate crumb or a milk and sugar precursor component therefor, in which molasses is utilized as the component thereof which will provide the caramel-like flavor ingredient portion of the flavor profile. However, the use of the designation "chocolate crumb" may be mandated in keeping with differing standards from country to country, insofar as the analysis and presence of milk and/or fat constituents, in particular, may be concerned. Nonetheless, the chocolate industry is a very large industry, and even within any one nation or chocolate producing region, utilization of chocolate crumb in keeping with any one or other set of specifications may be well established. Indeed, even in any single country or chocolate producing region, differing manufacturers may have somewhat different requirements and specifications as to their flavor profile, and as to their specific specifications for their chocolate crumb.

The above discussion has been in respect of generally accepted ranges and definitions for chocolate crumb as they are practiced and recognized in North America and the United Kingdom, in particular. However, as noted, the precise flavor profile and constituency of chocolate crumb, while within conventional bounds, is particularly determined by the chocolate maker as his study of the market may suggest or dictate. Nonetheless, chocolate crumb manufactured in keeping with the present invention, whether in a batch or from a milk and sugar precursor component therefor, and which utilizes molasses or brown sugar as the contributor of the caramel-like flavor ingredient, is to all intents and, purposes indistinguishable from chocolate crumb that has been previously available. It will, of course, be further processed in the same manner for the same purposes, as before.

The above discussions have been particularly by way of example; it is evident that modifications to the present invention may be adopted by skilled chocolate makers, without departing from the spirit and scope of the appended claims.

What is claimed is:

1. A method of preparation of an anhydrous milk and sugar precursor component intended for use in the production of milk chocolate, in which said milk and sugar precursor component will provide the entire dried milk solids content and flavor ingredient thereof;

wherein at least a first sugar portion of said milk and sugar precursor component is molasses;

said method comprising the steps of:
   (a) selecting a total weight of dried milk solids to be present in said milk and sugar precursor component;
   (b) selecting a quantity of molasses as said flavor ingredient to be present in said milk and sugar precursor component;
   (c) mixing said selected quantity of molasses with at least a first portion of liquid milk comprising a first portion of milk solids and a first portion of water, where said first portion of water is sufficient to hydrate said selected quantity of molasses so as to form a slurry batch of hydrated molasses and liquid milk;
   (d) if necessary, mixing said slurry batch with a second portion of liquid milk chosen so that the total weight of milk solids in said further mixed slurry batch from said first portion of liquid milk and said second portion of liquid milk is said total selected weight of milk solids;
   (e) drying said slurry batch from either step (c) or step (d) so as to obtain said selected total weight of milk solids as dried milk solids, together with said selected quantity of molasses as precipitate after dehydration thereof in a dried milk and sugar precursor component; and
   setting aside said dried milk and sugar precursor component for later use in the preparation of milk chocolate to be produced.

2. The method of claim 1, wherein said molasses is available as a constituent of brown sugar comprising an intimate mixture of fine sugar crystals and molasses, and wherein an amount of brown sugar is selected so as to provide said selected quantity of molasses together with a first portion of fine sugar crystals;

wherein said first portion of water in said first portion of liquid milk is sufficient to hydrate said selected quantity of molasses together with said first portion of fine sugar crystals;

so that following step (e), said dried milk and sugar precursor component comprises said total selected weight of dried milk solids, together with said selected quantity of molasses and said first portion of fine sugar crystals.

3. The method of claim 2, wherein said brown sugar is chosen from the group consisting of yellow sugar, light brown sugar, and dark brown sugar.

4. The method of claim 1, wherein the milk used in each of said first portion of liquid milk and said second portion of liquid milk is chosen from the group consisting of skim milk, whole milk, and condensed milk.

5. The method of claim 1, wherein step (e) is carried out in a conventional milk drier.

6. The method of claim 1, further comprising the step of:
   (g) after step (e), mixing said dried milk and sugar precursor component together with a second portion of sugar to form a sweet dried milk and sugar precursor component, wherein the total amount of sugar therein is equal to a selected amount of sugar to be present in the milk chocolate to be produced.

7. A method of preparation of anhydrous chocolate crumb which is intended to have a final analysis, expressed in weight units, as follows:

| | |
|---|---|
| dried milk solids | 23 to 34 |
| sugar and molasses as a sweetness and flavor ingredient | 50 to 55 |
| anhydrous cocoa butter and anhydrous cocoa liquor (if used) | 8 to 16 |
| additional anhydrous butter fat | 0 to 10 |
| moisture | less than 1 | wherein the total amount of dried milk solids and anhydrous butter fat, if used, is in the range of 30 to 34 weight units; and wherein anhydrous cocoa liquor is not used if the anhydrous chocolate crumb is to be anhydrous white chocolate crumb;

said method utilizing the method of claim 6, together with the further steps of:

(h) ensuring that the total amount of sugar in said sweet dried milk and sugar precursor of step (g), including the selected quantity of molasses, is in the range of 50 to 55 weight units and, if not, repeating step (g);

(i) adding additional anhydrous butter fat to said sweet dried milk and sugar precursor component, if necessary, so as to bring the total amount of dried milk solids and anhydrous butter fat to the range of 30 to 34 weight units; and (j) mixing said sweet dried milk and sugar precursor component, either just prior to step (i) or just following step (i), with anhydrous cocoa butter and anhydrous cocoa liquor, if used, so as to arrive at a total presence of 8 to 16 weight units thereof.

8. The method of claim 7, wherein, when both anhydrous cocoa butter and anhydrous cocoa liquor are used, they are present in the following amounts, expressed in weight units:

| anhydrous cocoa butter | 8 to 12 |
| anhydrous cocoa liquor | 4 to 8 |

9. A method of preparing chocolate crumb which is substantially anhydrous, wherein the prepared chocolate crumb will have a final analysis, expressed in weight units, as follows:

| dried milk solids | 23 to 34 |
| sugar | 50 to 55 |
| anhydrous cocoa butter | 8 to 12 |
| anhydrous cocoa liquor | 4 to 8 |
| additional anhydrous butter fat | 0 to 10 |
| moisture | less than 1 | wherein the total amount of dried milk solids and anhydrous butter fat is in the range of 30 to 34 weight units; and wherein at least a first portion of the sugar constituent of said chocolate crumb is brown sugar, comprising an intimate mixture of fine sugar crystals and molasses;

wherein said method of preparing said chocolate crumb comprises the steps of:

(a) mixing a first portion of liquid milk with at least said first portion of brown sugar, wherein said first portion of liquid milk comprises a first portion of milk solids and a first portion of water, which first portion of milk solids may include butter fat, and wherein said first portion of water is sufficient to hydrate said sugar, so as to from a slurry batch of hydrated brown sugar and liquid milk;

(b) mixing said slurry batch with a second portion of liquid milk, in the event that the weight of milk solids of said first portion of liquid milk is less than within the range of 23 to 34 weight units, so that the total weight of milk solids comprising the milk solids of said first portion of liquid milk and the milk solids of said second portion of liquid milk, if used, is in any event within the range of 23 to 34 weight units, so as to form a pre-crumb slurry;

(c) transferring said pre-crumb slurry to a conventional drier, and drying said pre-crumb slurry so as to obtain said total weight of milk solids as dried milk solids, together with said brown sugar;

(d) mixing said total weight of dried milk solids and said brown sugar together with a second portion of sugar, in the event that the weight of sugar of said first portion of sugar is less than within the range of 50 to 55 weight units, so that the total weight of sugar of said first portion of sugar and said second portion of sugar, if used, is in any event within the range of 50 to 55 weight units, so as to form a sweet pre-crumb slurry;

(e) mixing said sweet pre-crumb slurry together with the anhydrous cocoa butter and the anhydrous cocoa liquor, so as to arrive at the selected analysis amounts of each;

(f) adding additional anhydrous butter fat, if necessary, so as to bring the total amount of dried milk solids and anhydrous butter fat to the range of 30 to 34 weight units of the prepared chocolate crumb; and (g) refining said prepared chocolate crumb, if necessary, for pasting and conching the prepared chocolate crumb, as necessary for recovery and further processing or storage thereof.

10. The method of claim 9, wherein said second portion of sugar, if used, is chosen from the group consisting of refined white sugar and brown sugar.

11. The method of claim 10, wherein when said second portion of brown sugar is brown sugar, at least one of said first and said second portions of brown sugar is yellow sugar or light brown sugar.

12. The method of claim 9, wherein said first portion of liquid milk used in step (a) is skim milk, having a milk solids constituent of about 9% and no butter fat;

wherein the amount of said second portion of liquid milk used in step (b) yields an amount of dried milk solids, which when added to said milk solids from said first portion of liquid milk, brings the dried milk solids in said prepared chocolate crumb up to the range of at least 24 weight units thereof; and wherein up to 9 weight units of anhydrous butter fat is added to said prepared chocolate crumb in step (f).

13. The method of claim 9, wherein the total fat content, by weight units, of said prepared chocolate crumb is as follows:

| from the milk constituent | 0 to 9.6 weight units |
| from the cocoa liquor | 2.2 to 4.4 weight units |
| from the cocoa butter | 8 to 12 weight units |
| from the butter fat | 0 to 10 weight units | and wherein the total amount of fat content from all sources is in the range of 16 to 24 weight units of the prepared chocolate crumb.

14. The method of claim 9, wherein the liquid milk used in step (a) and in step (b), if used, is chosen from the group consisting of skim milk which has up to 92% by weight water, up to 9.6% by weight milk solids, and no butter fat; whole milk which has up to 89% by weight water, up to 9.6% by weight milk solids, and up to 5% by weight butter fat; and condensed milk which has 50% to 70% by weight water, up to 14.7% by weight milk solids, and up to 7.7% by weight butter fat.

15. A method of preparing white chocolate crumb which is substantially anhydrous, wherein the prepared white chocolate crumb will have a final analysis, expressed in weight units, as follows:

| | |
|---|---|
| dried milk solids | 23 to 34 |
| sugar | 50 to 55 |
| anhydrous cocoa butter | 8 to 16 |
| additional anhydrous butter fat | 0 to 10 |
| moisture | less than 1 | wherein the total amount of dried milk solids and anhydrous butter fat is in the range of 30 to 34 weight units; and wherein at least a first portion of the sugar constituent of said white chocolate crumb is brown sugar, comprising an intimate mixture of fine sugar crystals and molasses;

wherein said method of preparing said white chocolate crumb comprises the steps of:

(a) mixing a first portion of liquid milk with at least said first portion of brown sugar, wherein said first portion of liquid milk comprises a first portion of milk solids and a first portion of water, which first portion of milk solids may include butter fat, and wherein said first portion of water is sufficient to hydrate said sugar, so as to form a slurry batch of hydrated brown sugar and liquid milk;

(b) mixing said slurry batch with a second portion of liquid milk, in the event that the weight of milk solids of said first portion of liquid milk is less than within the range of 23 to 34 weight units, so that the total weight of milk solids comprising the milk solids of said first portion of liquid milk and the milk solids of said second portion of liquid milk, if used, is in any event within the range of 23 to 34 weight units, so as to form a pre-crumb slurry;

(c) transferring said pre-crumb slurry to a conventional drier, and drying said pre-crumb slurry so as to obtain said total weight of milk solids as dried milk solids, together with said brown sugar;

(d) mixing said total weight of dried milk solids and said brown sugar together with a second portion of sugar, in the e, vent that the weight of sugar of said first portion of sugar is less than within the range of 50 to 55 weight units, so that the total weight of sugar of said first portion of sugar and said second portion of sugar, if used, is in any event within the range of 50 to 55 weight units, so as to form a sweet pre-crumb slurry;

(e) mixing said sweet pre-crumb slurry together with the anhydrous cocoa butter, so as to arrive at the selected analysis amounts thereof;

(f) adding additional anhydrous butter fat, if necessary, so as to bring the total amount of dried milk solids and anhydrous butter fat to the range of 30 to 34 weight units of the prepared white chocolate crumb; and (g) refining said prepared white chocolate crumb, if necessary, for pasting and conching the prepared white chocolate crumb, as necessary for recovery and further processing or storage thereof.

16. The method of claim 15, wherein said second portion of sugar, if used, is chosen from the group consisting of refined white sugar and brown sugar.

17. The method of claim 16, wherein when said second portion of brown sugar is brown sugar, at least one of said first and said second portions of brown sugar is yellow sugar or light brown sugar.

18. The method of claim 15, wherein said first portion of liquid milk used in step (a) is skim milk, having a milk solids constituent of about 9% and no butter fat;

wherein the amount of said second portion of liquid milk used in step (b) yields an amount of dried milk solids, which when added to said milk solids from said first portion of liquid milk, brings the dried milk solids in said prepared white chocolate crumb up to the range of at least 24 weight units thereof; and wherein up to 9 weight units of anhydrous butter fat is added to said prepared white chocolate crumb in step (f).

19. The method of claim 15, wherein the total fat content, by weight units, of said prepared white chocolate crumb is as follows:

| | |
|---|---|
| from the milk constituent | 0 to 9.6 weight units |
| from the cocoa butter | 8 to 16 weight units |
| from the butter fat | 0 to 10 weight units | and wherein the total amount of fat content from all sources is in the range of 16 to 24 weight units of the prepared white chocolate crumb.

20. The method of claim 15, wherein the liquid milk used in step (a) and in step (b), if used, is chosen from the group consisting of skim milk which has up to 92% by weight water, up to 9.6% by weight milk solids, and no butter fat; whole milk which has up to 89% by weight water, up to 9.6% by weight milk solids, and up to 5% by weight butter fat; and condensed milk which has 50% to 70% by weight water, up to 14.7% by weight milk solids, and up to 7.7% by weight butter fat.

* * * * *